United States Patent [19]

Filcich et al.

[11] Patent Number: 4,660,703

[45] Date of Patent: Apr. 28, 1987

[54] METHOD AND APPARATUS FOR MACHINE SAFETY

[75] Inventors: Nevio Filcich, 33 Fyfe Road, Kellyville, New South Wales 2153; Robert A. T. Owen, Cabramatta, both of Australia

[73] Assignee: Nevio Filcich, Kellyville, Australia

[21] Appl. No.: 668,819

[22] Filed: Nov. 6, 1984

[30] Foreign Application Priority Data

Nov. 7, 1983 [AU] Australia .............................. PG2240

[51] Int. Cl.⁴ .............................................. F16D 13/14
[52] U.S. Cl. ................................. 192/130; 192/129 A; 100/53
[58] Field of Search .................... 192/129 A, 130, 132, 192/134; 100/53

[56] References Cited

U.S. PATENT DOCUMENTS

| 2,311,441 | 2/1943 | James | 192/130 |
| 4,166,369 | 9/1979 | Nakajima | 100/53 |
| 4,527,684 | 7/1985 | Eggeman et al. | 192/130 |

FOREIGN PATENT DOCUMENTS

| 2213247 | 3/1973 | Fed. Rep. of Germany . | |
| 2750234 | 1/1979 | Fed. Rep. of Germany | 192/129 A |
| 1510833 | 1/1968 | France . | |
| 2512920 | 3/1983 | France . | |
| 0027798 | 2/1984 | Japan | 100/53 |
| 8000036 | 1/1980 | PCT Int'l Appl. . | |
| 0784328 | 8/1957 | United Kingdom . | |

Primary Examiner—Rodney H. Bonck
Assistant Examiner—Alan G. Towner
Attorney, Agent, or Firm—Sandler & Greenblum

[57] ABSTRACT

The present invention discloses both a safety sensing system and a method of providing safety protection for presses or like industrial machines having a reciprocally movable operating head, ram, tool or beam. The basis of the system is the provision of a first beam (or a plurality of first beams) each of which is placed across and in front of the intended direction of travel of the pressing tool or blade. A second beam is arranged in the intended direction of travel and is broken by the tool or blade when the latter has reached a predetermined minimum height above a workpiece. A control system is provided which, during the operating stroke of the blade retracts the blade if any one or more of the first beam(s) is or are broken but the second beam is not broken. However, once the second beam is broken, the stroke of the blade is completed even if the first beam(s) is or are broken, for example, by folding of a pressed workpiece. An electronic control system including a central processing unit to implement the above-described method and system is also disclosed.

13 Claims, 9 Drawing Figures

METHOD AND APPARATUS FOR MACHINE SAFETY

BACKGROUND OF THE INVENTION

1. Field of the Invention

The present invention relates to machine safety and in particular to safety sensing systems for use with pressing type machines. In the present context "pressing type machines" is intended to include all industrial machines which have at least one reciprocally movable operating head, tool, ram or beam.

2. Description of the Prior Art

The potential for accidental injury during the operation of many types of industrial machines has resulted in the production of numerous devices to guard such machines. In this connection most machines are subject to strict government regulations which require that a guarding system meeting certain specified requirements be fitted to the machine before it can be operated. Numerous types of industrial machines cannot be guarded in the required manner by mechanical devices without resulting in a loss of productivity and/or a restriction on the operation of the machine.

Systems employing optical detection devices have been developed to overcome these difficulties and such systems generally comprise a light beam "barrier" between the operator and the machine. The barrier is typically formed from a number of parallel and co-planar light beams. When the light beam "barrier" is broken, the safety system operates to immobilise or slow the machine in some manner. These systems still suffer from limitations similar to mechanical guard systems particularly when used with machines such as pressing type machines which may require the operator to place a job under the pressing tool.

The major difficulty is that the beam used in the guard system cannot be located so close to the machine that it is broken by the material being pressed during the pressing operation and at the same time the beam cannot be located so far away from the machine that the danger area is accessible to the operator, for example, without breaking the beam.

SUMMARY OF THE INVENTION

It is the object of the present invention to provide a method of providing safety protection and a safety sensing system for use with pressing type machines which will overcome, or substantially ameliorate, the abovementioned disadvantages.

According to one aspect of the present invention, there is disclosed a method of providing safety protection for machines having a pressing tool reciprocally movable along a path towards and away from a workpiece, said method comprising the steps of locating one or more first stationary beams of electromagnetic radiation adjacent to said path and across the access to said path, locating a second stationary beam of electromagnetic radiation in said path a predetermined distance from said workpiece, interrupting the movement of said tool towards said workpiece if the first beam, or one of said first beams, is interrupted prior to the interruption of any other beam, but permitting the completion of the movement of said tool towards said workpiece only if said second beam is interrupted prior to the interruption of any other beam.

According to another aspect of the present invention, there is disclosed a safety sensing system for use with a machine having a pressing tool reciprocally movable along a path towards and away from a workpiece, said system comprising one or more first electromagnetic radiation transmitting means and a first electromagnetic radiation receiving means corresponding to each of said first transmitting means all being stationary and located to produce one or more first stationary beams of electromagnetic radiation extending from said first transmitting means to said first receiving means adjacent to said path and across the access to said path; a second stationary electromagnetic radiation transmitting means and a second stationary electromagnetic receiving means located to produce a second stationary beam of electromagnetic radiation lying in said path a predetermined distance from said workpiece, and a control circuit connected between said machine and said first and second means wherein said control circuit interrupts the movement of said tool towards said workpiece if said first beam, or if at least one of said first beams, is interrupted prior to the interruption of any other beam, but permits the completion of the movement of said tool towards said workpiece only if said second beam is interrupted prior to the interruption of any other beam.

Preferably, the electromagnetic radiation transmitters and receivers respectively transmit and receive either a light beam or a pulsed beam of infrared radiation.

Preferably, the monitoring means includes a self checking device which checks that the safety sensing system is operating correctly at least once during every cycle of machine operation.

BRIEF DESCRIPTION OF THE DRAWINGS

One embodiment of the present invention will now be described with reference to the drawings in which.

DETAILED DESCRIPTION OF THE INVENTION

Figure 1:
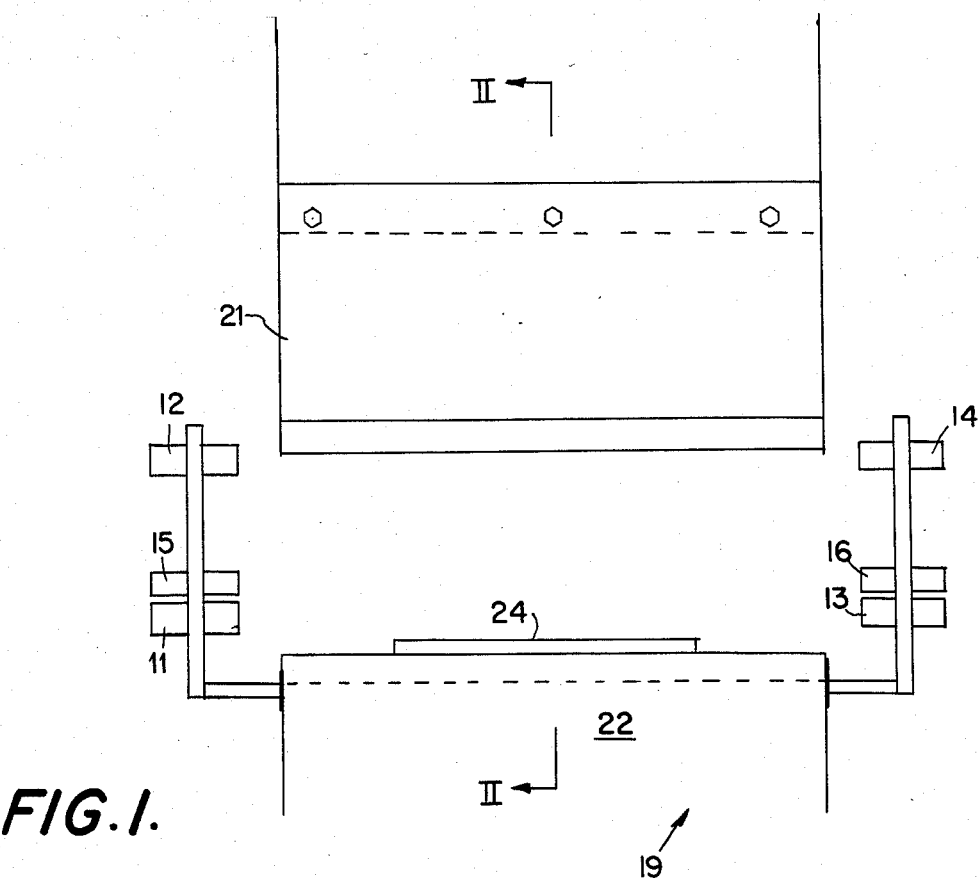
FIG. 1 is a front elevation of part of a pressing machine to which the safety sensing system of the preferred embodiment is connected.
Figure 2:
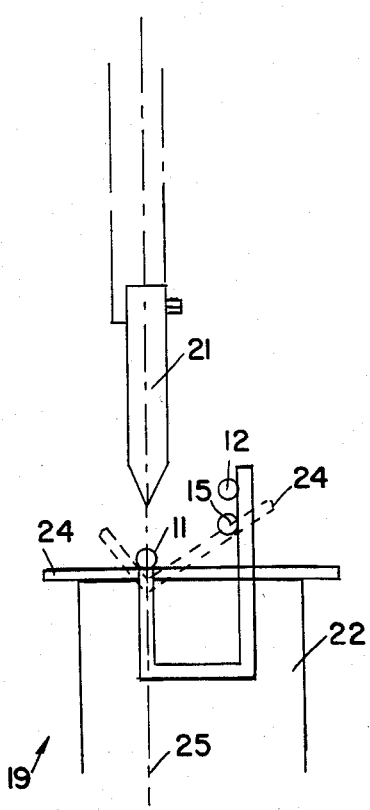
FIG. 2 is a transverse cross-section along the line II—II of FIG. 1.

Turning now to FIGS. 1 and 2, there is schematically represented a pressing machine 19 having a pressing blade 21 which is receiprocally movable along a vertical axis 25 (illustrated in FIG. 2). The pressing machine further includes a base or bed 22 on which a workpiece 24, initially in the form of a flat sheet of metal, is placed prior to being pressed by the pressing blade 21 into an approximately L-shaped piece of metal as indicated by dashed lines in FIG. 2.

An electromagnetic radiation transmitting unit 11 and an electromagnetic radiation receiving unit 13 are located at opposite ends of the pressing machine 19 with the straight line path between the units 11, 13 being arranged on the vertical axis 25 at a predetermined position just above the unpressed job 24.

Further electromagnetic radiation transmitting units 12 and 15, and corresponding electromagnetic radiation receiving units 14 and 16 are also located at respective opposite ends of the pressing machine 19 with the path between each pair of units 12, 14 and 15, 16 arranged to traverse the area immediately adjacent the path of the pressing blade 21. Thus the units 12 and 14 to 16 are arranged in a vertical plane which is substantially parallel to the vertical plane containing the axis 25 and pressing blade 21. The preferred form of transmitting and receiving unit is known per se and is an optical unit manufactured by Fuso Electric Industrial Co. Ltd. of Tokyo, Japan. However, infrared radiation transmitting and receiving units are also able to be used in accordance with the present invention.

The pressing machine 19 is operated with a conventional control switch (not illustrated) which is used to lower and raise the pressing blade 21. The control switch is manipulated by an operator so that the normal sequence of operation of the pressing machine 19 is that with the pressing blade 21 raised, the flat workpiece 24 is placed on the bed 22 in the position illustrated in FIG. 1, then the control switch is operated so as to lower the pressing blade 21, thereby bending the workpiece 24 into the substantially L-shaped configuration illustrated by broken lines in FIG. 2. The control switch is again manipulated so as to raise the pressing blade 21, and finally the bent workpiece 24 is removed from the bed 22. This process is repeated and in order to achieve high productivity, must be repeated quickly.

However, in order to operate the pressing machine safely, it is important to ensure that the operator's fingers or some other part of the operator's body (or even some other obstruction) is not located underneath the pressing blade 21 as it is descending.

It is known in the prior art to provide a plurality of receiving and transmitting units such as 12, 14, 15 and 16 and, if any one of the beams passing between these units is broken, then the downwards movement of the pressing blade 21 is reversed. This action is required since the breaking of such a beam would indicate that possibly an operator's hand has moved into the beam area and thus may be under the blade 21. The difficulty with such an arrangement is, as best seen in FIG. 2, that during the bending procedure, the workpiece 24 may itself pass through one or more of the beams passing between the units 12, 14, 15 and 16. On prior art equipment this would interrupt the pressing procedure before it is fully completed and it is known for such prior art safety equipment to be disabled in order to prevent such interruptions.

This difficulty is overcome in accordance with the preferred embodiment of the present invention by the provision of the extra beam which passes between the units 11 and 13. This beam is located a predetermined distance above the undeformed workpiece 24 and this predetermined distance is substantially equal to the expected minimum height of the pressing blade 21 above the workpiece 24 which leaves a gap so small that the fingers of an operator cannot be inserted between the pressing blade 21 and the workpiece 24.

Thus when the pressing blade 21 has been lowered sufficiently for the beam passing between units 11 and 13 to be broken, then it is virtually impossible for the operator to locate one or more of his fingers between the blade 21 and workpiece 24. In this case, the interruption of the beam passing between units 11 and 13 can be used to disable any signal received thereafter by the system as a result of the interruption of any of the beams passing between units 12 and 15, and 14 and 16 respectively. Thus, with an appropriate control circuit, because the tip of the pressing blade 21 has passed below the level of the units 11 and 13 (as seen in FIG. 2), the fact that the bending of the workpiece 24 results in the workpiece intercepting and breaking the beam passing between units 15 and 16, does not cause retraction of the pressing blade 21.

Consequently the desired operation of the controlling circuitry is as follows: with the pressing blade 21 raised to the top of its stroke and before commencement of the stroke, if any one of the beams between the units 11–16 is broken, then the control system overrides the operating switch manually operated by the machine operator, and prevents lowering of the pressing blade 21.

However, during the downwards stroke, as the pressing blade 21 is descending, the descent of the pressing blade 21 is only interrupted if any one or more of the beams passing between units 12, 15 and 14, 16 is interrupted.

Finally, once the beam passing between units 11 and 13 is interrupted, interruption of any one or more of the beams passing between units 12, 15 and 14, 16 will not prevent completion of stroke of the pressing blade 21. It will be appreciated in this connection that it is impossible for the operator to place his hand under the pressing blade 21 during its downward stroke so as to break the beam passing between units 11 and 13, without first having broken the beam passing between, say, units 15 and 16.

Figure 3:
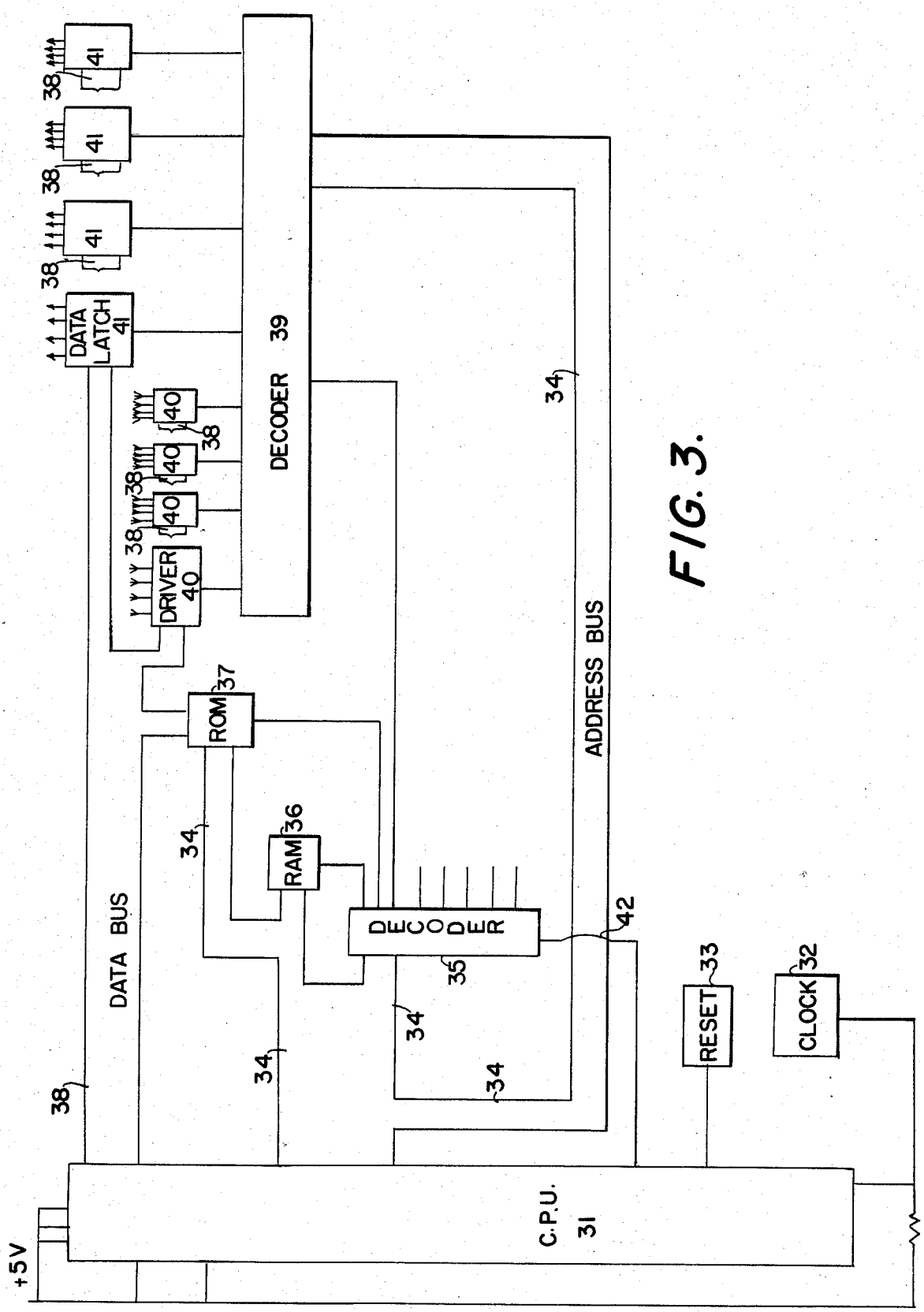
FIG. 3 is a schematic block diagram of the circuit arrangement of the safety sensing system of the preferred embodiment.

One embodiment of a suitable control circuit to carry out the above described functions will now be described with reference to FIGS. 3 to 9 inclusive. As seen in FIG. 3, the heart of the control system is a programmed central processor unit 31 which typically comprises a single integrated circuit such as that sold under the trade name ZILOG Z-80. Connected to the CPU unit 31 is a clock unit 32 which preferably has a frequency of 2 MHz, and a reset unit 33. An address bus 34 connects the CPU 31 to an 8 line 8 bit decoder 35 which can be realised as an integrated circuit LS138 as sold by NATIONAL SEMICONDUCTOR. The first 3 bits of the address bus 34 are connected to both a random access memory (RAM) 36 and a read only memory (ROM) 37, while the remaining bits of the address bus 34 are provided for the decoder 35. The RAM 36 preferably takes the form of a type 2116 integrated circuit whereas the ROM 37 can take the form of any one of type 2732, 2716 and 2708 integrated circuits.

The ROM 37 is also connected to a data bus 38 and one of the outputs of the decoder 35. Another one of the outputs of decoder 35 is connected to the RAM 36 and a third output of the decoder 35 is connected to a port decoder 39. The port decoder 39 is preferably realised by a type LSI138 integrated circuit as sold by NATIONAL SEMICONDUCTOR.

The port decoder 39 is connected to the address bus 34 and has four input ports each of which is connected an 8 bit tri-state driver 40. The four tri-state drives 40 are preferably realised by means of a type LS244 integrated circuit as sold by NATIONAL SEMICONDUCTOR. Each of the tri-state drivers 40 has eight input terminals to be connected to circuitry to be described hereafter, and is also connected to the data bus 38.

In addition, the four outputs of the port decoder 39 are each connected to an 8 bit data latch 41. Each of the four data latches 41 has 8 output bits which are used to drive circuits to be described hereafter. In addition, each of the data latches 41 is connected to the data bus 38. Finally, the CPU 31 and the decoder 35 are interconnected by means of a memory select line 42.

Figure 4:
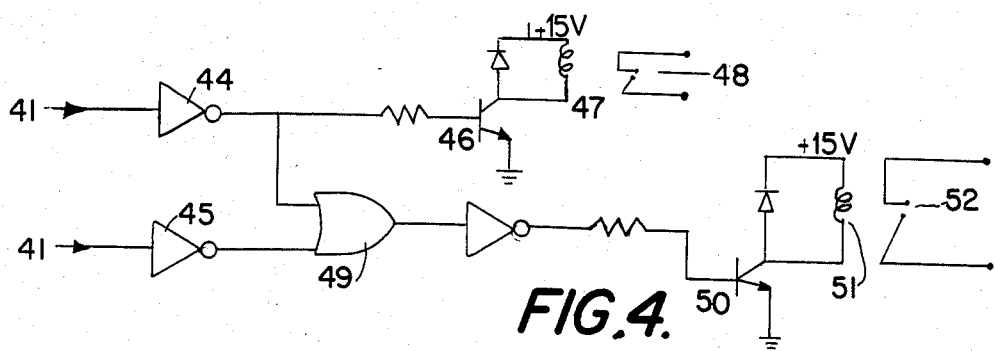
FIG. 4 is a circuit diagram showing the circuit connections driven by the outputs of the circuit of FIG. 3.
Figure 5:
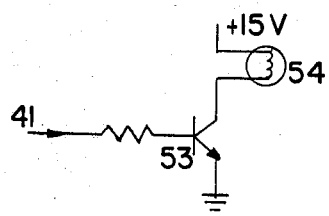
FIG. 5 is a circuit diagram showing another circuit arrangement driven by an output of the circuit of FIG. 3.

Turning now to FIGS. 4 and 5, the outputs of the data latches 41 are connected to the circuits of FIGS. 4 and 5 so as to interconnect the control circuitry of FIG. 3 with the conventional operating circuits (not illustrated) on the pressing machine 19. Thus as seen in FIGS. 4 and 5, the outputs of data latches 41 are connected via inverters 44 and 45. The output of inverter 44 drives a control transistor 46 which operates the convention relay coil 47 having relay contacts 48 which are normally open and, when closed, stop the downward motion of the pressing blade 21. Similarly, the output of both inverters 44 and 45 passes through a NOR gate 49 to a further control transister 50 with its associated relay coil 51 and relay contacts 52. The relay contacts 52 control the commencement of upward motion of the pressing blade 21. The NOR gate 49 provides the appropriate logic control which, together with the outputs of the data latches 41, produces the desired operation of the pressing blade 21.

Turning now to FIG. 5, one output of one of the data latches 41 is also connected via switching transistor 53 to an indicator light 54 which is illuminated when the beam passing between units 11 and 13 of FIGS. 1 and 2 is broken.

Figure 6:
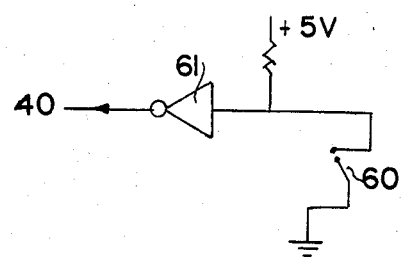
FIG. 6 is a circuit arrangement showing an input circuit for the circuit arrangement of FIG. 3.

The circuit of FIG. 6 is also able to receive inputs from the apparatus of FIGS. 1 and 2. Thus if any one of the beams of FIGS. 1 and 2 is broken, a corresponding relay contact 60 is closed thereby passing a signal via inverting buffer 61 to the corresponding input of one of the tri-state drivers 40, the output of which passes an appropriate signal via the data bus 38 to the CPU 31 of FIG. 3.

Figure 7:
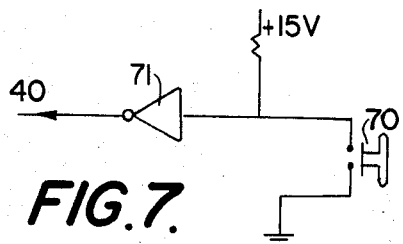
FIG. 7 is a circuit arrangement showing an input circuit for the circuit arrangement of FIG. 3.

A further input circuit is provided in FIG. 7 in which a pulse mode switch 70, if momentarily operated passes a signal via inverting buffer 71 and corresponding tri-state driver 40 to the CPU thereby permitting the activation of the circuit of FIG. 4 by the CPU 31 in a manner such that the pressing blade 19 is caused to operate in an incremental or pulse fashion rather than in a continuous fashion during its downward stroke. In this way, "inching" or the downward movement of the pressing blade 21, is able to be achieved by appropriate manipulation of the input data by the central processor unit 31.

Figure 8:
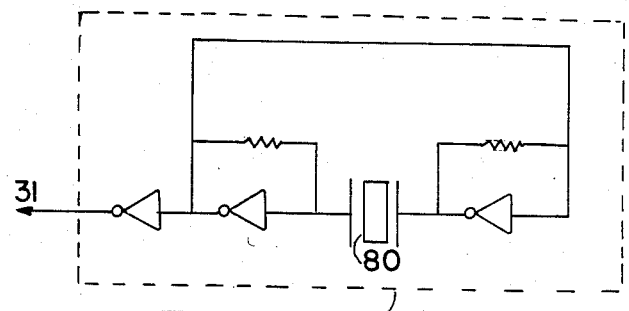
FIG. 8 is a circuit diagram showing the details of the clock generator of FIG. 3.
Figure 9:
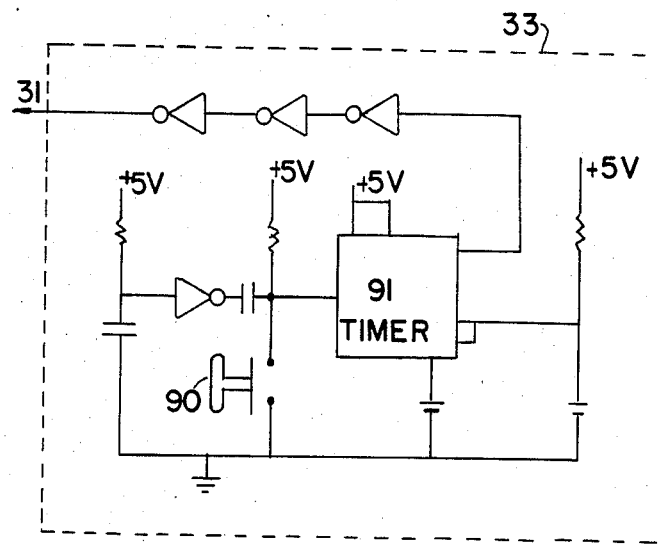
FIG. 9 is a circuit diagram showing the details of the reset block of FIG. 3.

FIG. 8 illustrates in schematic form the circuit of the clock unit 32 of FIG. 3 with the clock frequency being set by a quartz crystal 80. Similarly, the circuit diagram of the reset unit 33 of FIG. 3 is illustrated in detail in FIG. 9, the momentary depression of a reset button 90 activating a timer 91 which momentarily disables the central processor unit 31 for a predetermined number of cycles of the clock 32 so as to permit resetting of the CPU 31. The timer 91 of FIG. 9 comprises a type 555 integrated circuit, as sold by NATIONAL SEMICONDUCTOR.

The foregoing describes only one embodiment of the present invention and modifications, obvious to those skilled in the art, may be made thereto without departing from the scope of the present invention. For example, the beams transmitted between the units 11-16, can be pulsed so as to prevent the possibility of accidental triggering by other sources of radiation, such as sunlight. In addition, the transmitting units 11, 12 and 15 and/or the receiving units 13, 14 and 16 can be fitted with mechanical shutters (not illustrated) which are opened when power is supplied to the units. These shutters provide further protection in the event of a power failure, for example, for mechanically preventing the transmission of a beam unless power is supplied to all units.

What we claim is:

1. A method of providing safety protection for machines having a pressing tool reciprocally movable along a path towards and away from a workpiece, said method comprising the steps of locating at least one first stationary beam of electromagnetic radiation adjacent to said path and across the access to said path, locating a second stationary beam of electromagnetic radiation in said path a predetermined distance from said workpiece, interrupting the movement of said tool towards said workpiece if said at least one first beam is interrupted prior to the interruption of any other beam, and permitting the completion of the movement of said tool towards said workpiece only if said second beam is interrupted prior to the interruption of any other beam.

2. The method of claim 1 including the step of locating a plurality of said first beams each parallel to, and spaced apart from each other.

3. The method as claimed in claim 1 or 2 wherein said predetermined distance between said workpiece and said second beam is substantially equal to the largest gap between said tool and said workpiece into which the fingers of an operator cannot be inserted.

4. The method as claimed in claim 1 or 2 wherein during said completion of the movement of said tool said workpiece is bent and a portion of the bent workpiece interrupts said at least one first beam.

5. A safety sensing system for use with a machine having a pressing tool reciprocally movable along a path towards and away from a workpiece, said system comprising at least one first electromagnetic radiation transmitting means and a first electromagnetic radiation receiving means corresponding to each of said at least one first transmitting means, each of said at least one first electromagnetic radiation transmitting means and said corresponding first electromagnetic radiation receiving means being stationary, and located to produce at least one first stationary beam of electromagnetic radiation extending from said at least one first transmitting means to said corresponding first receiving means adjacent to said path and across the access to said path, a second stationary electromagnetic radiation transmitting means and a second stationary electromagnetic receiving means located to produce a second stationary beam of electromagnetic radiation lying in said path a predetermined distance from said workpiece, and a control circuit connected between said machine and said first and second transmitting and receiving means wherein said control circuit interrupts the movement of said tool towards said workpiece if said at least one first beam is interrupted prior to the interruption of any other beam, and permits the completion of the movement of said tool towards said workpiece only if said second beam is interrupted prior to the interruption of any other beam.

6. The system as claimed in claim 5 wherein said predetermined distance between said workpiece and said second beam is substantially equal to the largest gap between said tool and said workpiece into which the fingers of an operator cannot be inserted.

7. The system as claimed in claim 5 or 6 wherein said at leat one first beam is located in a position through which a portion of said workpiece passes as said workpiece is bent during said completion of the movement of said tool.

8. The system as claimed in claim 5 or 6 wherein said control circuit comprises an inter-connected central processor unit, a memory store, and a decoder, and means to pass signal to, and receive signals from, the operating circuit of said machine.

9. A method of providing safety protection for machines having a pressing tool adapted to move reciprocally along a path in a first plane towards and away from a workpiece, said method comprising the steps of:
 a. providing first stationary detecting means in a second plane adjacent and parallel to said first plane;
 b. providing second stationary detecting means in said first plane a predetermined distance above said workpiece;
 c. interrupting the movement of said tool towards said workpiece if said first stationary detecting means detects an object prior to detection of an object by said second stationary detecting means; and
 d. completing movement of said tool towards said workpiece only if said second stationary detecting means detects an object prior to detection of an object by said first stationary detecting means.

10. A safety sensing system for a machine having a pressing tool adapted to be reciprocally movable along a path in a first plane towards and away from a workpiece, said system comprising:
 a. at least one first stationary transmitting means for generating at least one first beam;
 b. at least one first stationary receiving means corresponding to said at least one first stationary transmitting means for receiving said at least one first beam, said at least one first stationary transmitting and receiving means each being positioned in a second plane adjacent and parallel to said first plane;
 c. second stationary transmitting means for generating a second beam;
 d. second stationary receiving means corresponding to said second stationary transmitting means for receiving said second beam, said second stationary transmitting and receiving means each being positioned in said first plane so that said second beam extends between said second stationary transmitting and receiving means a predetermined distance above said workpiece; and
 e. a control circuit connected between said machine and said first and second transmitting and receiving means, wherein said control circuit interrupts the movement of said tool towards said workpiece if said at least one first beam is interrupted prior to the interruption of said second beam, and said control circuit completes movement of said tool towards said workpiece only if said second beam is interrupted prior to the interruption of said at least one first beam.

11. The system as claimed in claim 10 wherein:
 a. said at least one first stationary transmitting means and said second stationary transmitting means comprise means for generating electromagnetic radiation; and
 b. said first and second receiving means comprise means for receiving electromagnetic radiation.

12. The system as claimed in claim 10 wherein:
 a. said at least one first stationary transmitting means and said second stationary transmitting means comprise means for generating infrared radiation; and
 b. said first and second receiving means comprise means for receiving infrared radiation.

13. The system as claimed in claim 10 wherein said control circuit comprises:
 a. a central processing unit;
 b. memory means connected to said central processing unit;
 c. a decoder connected to said central processing unit; and
 d. means for transmitting and receiving signals from said machine.

* * * * *

UNITED STATES PATENT AND TRADEMARK OFFICE
CERTIFICATE OF CORRECTION

PATENT NO. : 4,660,703

DATED : April 28, 1987

INVENTOR(S) : Nevio FILCICH et al.

It is certified that error appears in the above-identified patent and that said Letters Patent is hereby corrected as shown below:

At column 2, line 3 of the printed patent, change "electromagentic" to ---electromagnetic---.

At column 2, line 62 of the printed patent, change "receiprocally" to ---reciprocally---.

At column 4, line 49 of the printed patent, change "realised" to ---realized---.

At column 4, line 62 of the printed patent, change "realised" to ---realized---.

At column 4, line 66 of the printed patent, insert ---on---- after "connected".

At column 4, line 67 of the printed patent, change "drives" to ---drivers---.

At column 4, line 68 of the printed patent, change "realised" to ---realized---.

At column 7, line 9 of the printed patent, change "leat" to ---least---.

Signed and Sealed this

Twentieth Day of September, 1988

Attest:

DONALD J. QUIGG

Attesting Officer

Commissioner of Patents and Trademarks